Feb. 3, 1959     M. E. GLUHAREFF     2,872,137
SECTIONAL AIRCRAFT FUSELAGE
Filed July 11, 1955     2 Sheets-Sheet 2
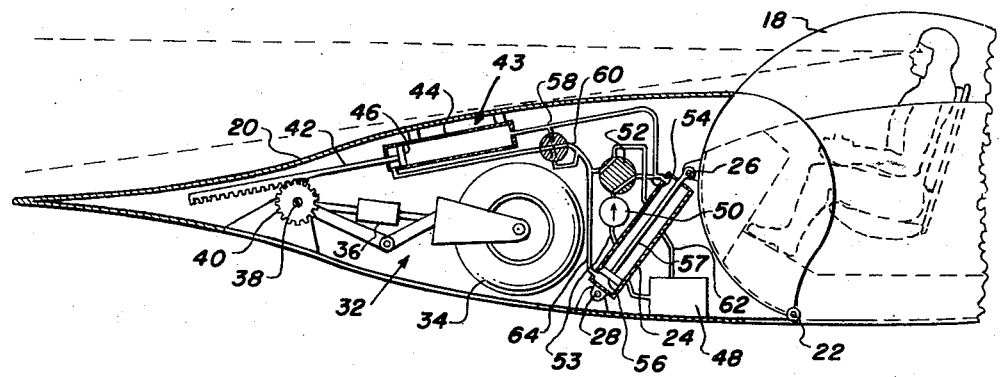
Fig. 4
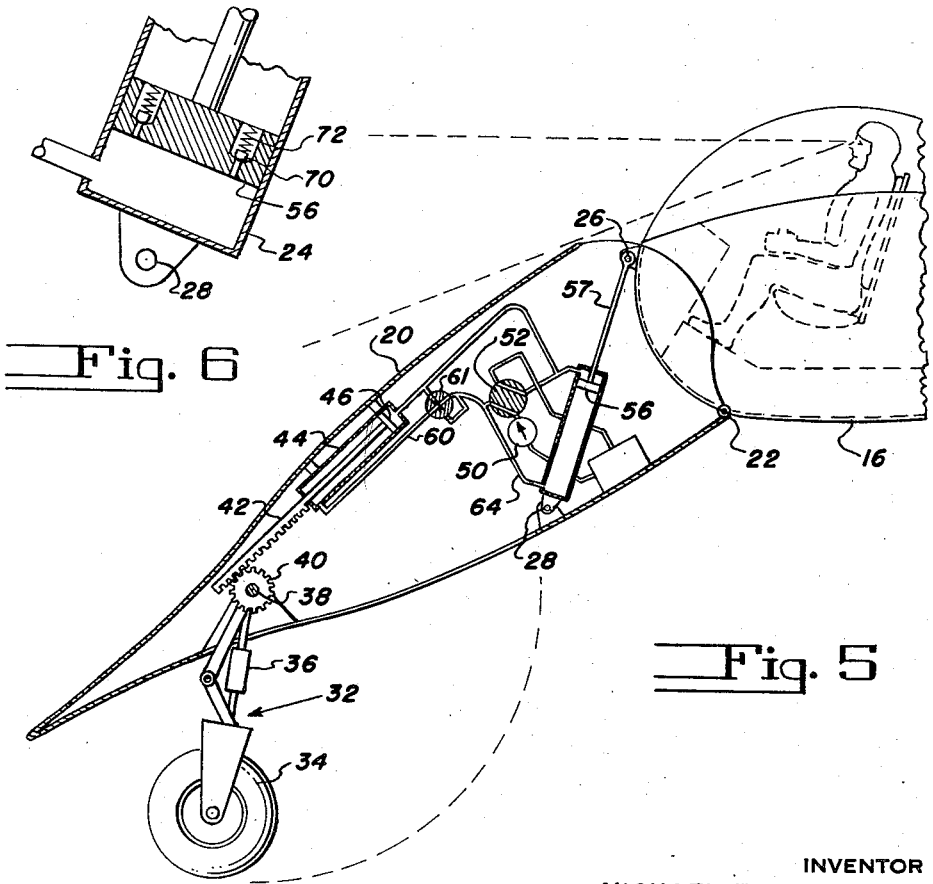
Fig. 6
Fig. 5
INVENTOR
MICHAEL E. GLUHAREFF
BY M. B. Tasker
ATTORNEY United States Patent Office 2,872,137
Patented Feb. 3, 1959

2,872,137

SECTIONAL AIRCRAFT FUSELAGE

Michael E. Gluhareff, Fairfield, Conn., assignor to United Aircraft Corporation, East Hartford, Conn., a corporation of Delaware Application July 11, 1955, Serial No. 520,949

7 Claims. (Cl. 244—120)

This invention relates to airplanes and particularly to all-wing, tailless airplanes of very low aspect ratio having a triangular plan form wing. An airplane of this type is disclosed in my Patent No. 2,511,502 issued June 13, 1950 and assigned to the assignee of this application. Due to the severe sweepback of the wing, these airplanes are sometimes referred to as dart-shaped airplanes.

Such an airplane has low parasite drag and is capable of operation at very high speeds without compressibility problems and can operate as well at very high angles of attack without danger of stalling. However, at these high angles of attack the pilot has very poor visibility in a forward direction such as might occur during landing approach since the projecting nose of the fuselage obstructs his view of the ground.

It is an object of this invention to provide a dart-shaped airplane having good pilot visibility during the landing approach.

Another object is to provide a high-speed airplane of this type having a downwardy movable nose section which will carry a relatively short nose landing gear and reduce the problems of retraction and extension which would normally be required with a long nose gear which would otherwise be necessary to accommodate the high landing angles.

A further object of the invention is to provide such an airplane for a nose landing gear retractable into the foldable nose section.

A still further object of the invention is to provide means operative by the pilot for automatically extending the nose gear as the nose section of the fuselage is lowered preparatory to making a landing.

A further object is generally to improve the landing characteristics of dart-type airplanes. These and other features of novelty of the invention will be pointed out in the following detailed description of a preferred embodiment of the invention as shown in the accompanying drawings.

In these drawings:

Fig. 4 is an enlarged sectional view of the forward portion of the fuselage including the pilot's compartment;

Fig. 5 is a similar view showing the nose landing gear extended and the folding nose section of the fuselage in its down position; and Fig. 6 is a detail of the strut for folding and unfolding the nose section.

Figure 1:
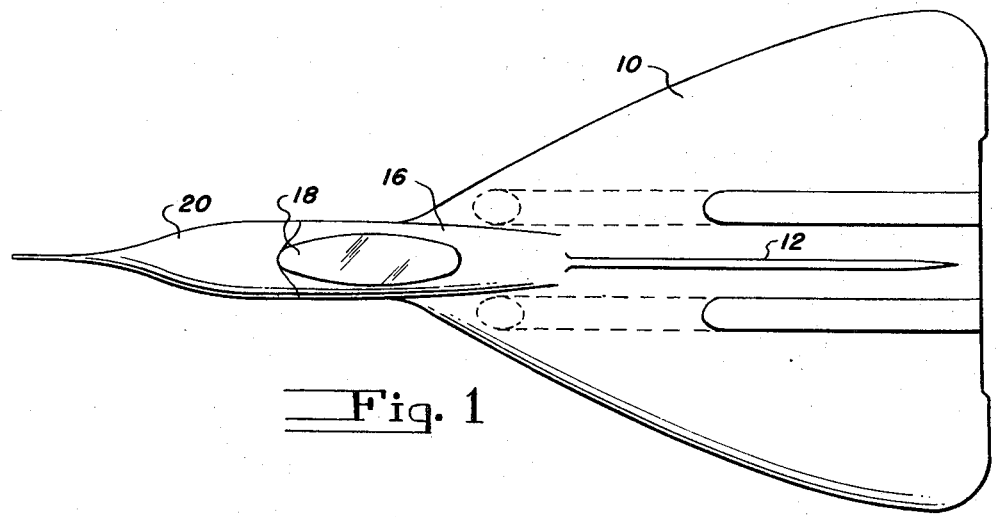
Fig. 1 is a plan view of an airplane embodying the invention.
Figure 2:
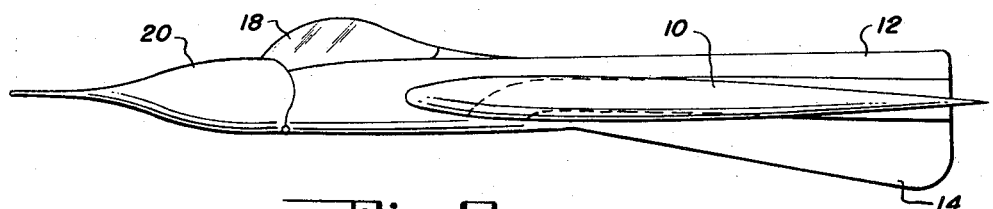
Fig. 2 is a side view of the airplane as it would appear in flight.
Figure 3:
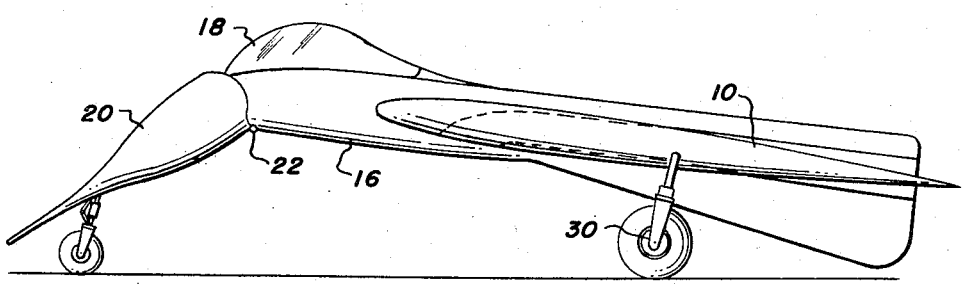
Fig. 3 is a side view of the airplane with its tricycle gear extended and resting on the ground.

The body 10 of the airplane consists of a symmetrical, elliptical airfoil section of isosceles triangular plan form providing an all-wing tailless airplane of low aspect ratio. Centrally located upper and lower fixed stabilizer fins 12 and 14 are provided which extend from substantially the trailing edge of the wing well forward into the wing where they merge smoothly into the upper and lower surfaces of the wing adjacent its apex. A fuselage 16 projects forwardly from the apex of the wing to provide a pilot compartment 18 and a sharply protruding nose section 20 which is structurally separate from the rest of the fuselage and is connected thereto by a hinge 22 and by an actuating hydraulic strut 24 having a piston 56. Strut 24 is pivotally connected to the forward end of the pilot compartment at 26 and is pivotally connected to the nose section 20 at 28.

The airplane is supported on tricycle landing gear including a pair of retractable main gears 30 and a forward nose gear 32 which is retractable into the nose section 20. As shown most clearly in Fig. 4, the nose gear includes the ground engaging wheel 34 supported by oleo strut or liquid spring 36 which is shown schematically pivoted to frame structure of the nose section 20 on a shaft 38.

Shaft 38 carries a pinion 40 which cooperates with the teeth of a rack 42 controlled by a hydraulic strut 43 comprising cooperating cylinder and piston elements 44 and 46. It will be understood that as the piston 46 moves to the right in cylinder 44, rack 42 will rotate pinion 40 and shaft 38 attached to it to swing the nose landing gear into the extended position relative to the nose section shown in Fig. 5.

Hydraulically actuated means is provided for operating the two struts 24 and 43 including the fluid sump 48, pump 50 and manually operable valve 52 the control for which is within the reach of the pilot. When the valve is in the position shown in Fig. 4, fluid from sump 48 passes through the pipe 53, pump 50, valve 52 and pipe 54 to strut 24, thus admitting fluid to the cylinder of strut 24 on the right-hand side of the piston 56. Since the piston rod 57 is connected to the fuselage at point 26 the cylinder of strut 24 which is connected to the nose section 20 at 28 will be drawn up into the Fig. 4 position in which the nose section is folded. At the same time, fluid is admitted through pipe 58 to cylinder 44 of strut 43 causing the piston 40 to move to the left-hand end of cylinder 44, retracting the nose gear into the Fig. 4 position. During this operation fluid on the left-hand side of piston 46 flows through pipe 60, valve 52, and pipe 62 back to the sump while fluid from the left-hand side of piston 56 returns through pipe 64, valve 52 and pipe 62 to the sump.

It will be obvious that when the pilot moves the valve 52 to the position shown in Fig. 5, fluid delivered by the pump 50 will pass through valve 52, and pipe 60 to act on the left-hand side of piston 46 to extend the nose gear while fluid will simultaneously pass through pipe 64 to act on the left-hand side of piston 56 to move the nose section into the Fig. 5 position.

Piston 56, as shown in Fig. 6, has a plurality of relief valves 70 which are normally held closed by springs 72. These valves provide for a certain amount of shock absorbing action when the wheel 34 engages the ground in landing, fluid being allowed to pass through valves 70 to relieve the shock of landing. Pump 50, however, will immediately replace the fluid passed through the valves 70 to reposition nose section 20. When the airplane is at rest, the valve 61 may be rotated by the pilot into a position shown in the dotted lines so as to relieve the pressure in piston 56 and return the nose to its normal position without retracting the nose gear. This would permit easier access to the aircraft and pilot compartment.

An all-wing tailless airplane of this type flies at a higher angle of attack than an ordinary airplane of high aspect ratio. As the pilot makes his approach for a landing the nose section of the fuselage blankets his view in a forward direction. By moving the valve 52 into the Fig. 5 position, fluid is directed to fold the nose section 20 so as to obtain good forward visibility as the landing gear is lowered.

It will thus be evident that as a result of this invention the forward visibility in an all-wing low aspect ratio airplane has been greatly improved with the consequent reduction in landing accidents.

While I have shown one embodiment of the invention in the accompanying drawings, it will be evident that various changes may be made in the construction and arrangement of the parts without departing from the scope of the invention.

I claim:

1. In an airplane, a fuselage having a main body and a nose section, said nose section being pivotally connected to said body, retractable landing gear carried by said nose section, means for moving said nose section about its pivotal connection into a downwardly directed angular position with respect to the remainder of said fuselage, said last named means including a first cylinder and piston unit, one element of said first unit being connected to said nose section, the other element of said first unit being connected to said body, means for moving said landing gear between a retracted and extended position, said last named means including a second cylinder and piston unit, one element of said second unit being connected to said nose section, the other element of said second unit being connected to said landing gear, and means for directing fluid simultaneously to said first and second cylinder and piston units for moving said nose section into its downwardly directed angular position and moving said landing gear into its extended position.

2. In an airplane, a fuselage having a main body and a nose section, said nose section being pivotally connected to said body, retractable landing gear carried by said nose section, means for moving said nose section about its pivotal connection into a downwardly directed angular position with respect to the remainder of said fuselage, said last named means including a first cylinder and piston unit, one element of said first unit being connected to said nose section, the other element of said first unit being connected to said body, means for moving said landing gear between a retracted and extended position, said last named means including a second cylinder and piston unit, one element of said second unit being connected to said nose section, the other element of said second unit being connected to said landing gear, and means for directing fluid simultaneously to said first and second cylinder and piston units for moving said nose section into its downwardly directed angular position and moving said landing gear into its extended position, said first cylinder and piston unit having means providing a shock absorbing action between said body and said nose section.

3. In an airplane, a fuselage having a main body and a nose section, said nose section being pivotally connected to said body, retractable landing gear having a wheel carried by said nose section, means for moving said nose section about its pivotal connection into a downwardly directed angular position with respect to a remainder of said fuselage, said last named means including a first cylinder and piston unit, one element of said first unit being connected to said nose section, the other element of said first unit being connected to said body, means for moving said landing gear between a retracted and extended position, said last named means including a second cylinder and piston unit, one element of said second unit being connected to said nose section, the other element of said second unit being connected to said landing gear, and means for directing fluid simultaneously to said first and second cylinder and piston units for moving said nose section into its downwardly directed angular position and moving said landing gear into its extended position, said first cylinder and piston unit having means including a relief valve providing a shock absorbing action between said body and said nose section, said landing gear having means providing a shock absorbing action between said wheel and said nose section.

4. In an airplane, a fuselage having a main body and a nose section, said nose section being pivotally connected to said body, retractable landing gear carried by said nose section, first means for moving said nose section about its pivotal connection between an upward position and a downwardly directed angular position with respect to the remainder of said fuselage, second separate means for moving said landing gear between a retracted and extended position, first valve means for operating said last two means simultaneously moving said nose section into its downwardly directed angular position and moving said landing gear into its extended position, and second valve means associated with said first valve means for repositioning said nose section in its upward position while maintaining said landing gear in its extended position.

5. In an airplane, a fuselage having a main body and a nose section, said nose section being pivotally connected to said body, retractable landing gear carried by said nose section, first means for moving said nose section about its pivotal connection between an upward position and a downwardly directed angular position with respect to the remainder of said fuselage, said last named means including a first cylinder and piston unit, second separate means for moving said landing gear between a retracted and extended position, said last named means including a second cylinder and piston unit, first valve means for directing fluid simultaneously to said first and second cylinder and piston units for moving said nose section into its downwardly directed angular position and moving said landing gear into its extended position, and second valve means connected to said first cylinder for directing fluid from said first cylinder for repositioning said nose section in its upward position.

6. In an airplane, a fuselage having a main body and a nose section, said nose section being pivotally connected to said body, retractable landing gear carried by said nose section, first means for moving said nose section about its pivotal connection between an upward position and a downwardly directed angular position with respect to the remainder of said fuselage, said last named means including a first cylinder and piston unit, one element of said first unit being connected to said nose section, the other element of said first unit being connected to said body, second separate means for moving said landing gear between a retracted and extended position, said last named means including a second cylinder and piston unit, first valve means for directing fluid simultaneously to said first and second cylinder and piston units for moving said nose section into its downwardly directed angular position and moving said landing gear to its extended position, said first cylinder and piston unit having means providing a shock absorbing action between said body and said nose section, and second valve means connected to said first cylinder for directing fluid from said first cylinder for repositioning said nose section in its upward position.

7. In an airplane, a fuselage having a main body and a nose section, said nose section being pivotally connected to said body, retractable landing gear carried by said nose section, first means for moving said nose section about its pivotal connection between an upward position and a downwardly directed angular position with respect to the remainder of said fuselage, said last named means including a first cylinder and piston unit, one element of said first unit being connected to said nose section, the other element of said first unit being connected to said body, second separate means for moving said landing gear between a retracted and extended position, said last named means including a second cylinder and piston unit, first valve means for directing fluid simultaneously to said first and second cylinder and piston units for moving said nose section into its downwardly directed angular position and moving said landing gear into its extended position, said first cylinder and piston unit having means providing a shock absorbing action between said body and said nose section, and second valve means connected to said first cylinder for directing fluid from said first cylinder for repositioning said nose section in its upward position and maintaining the fluid in said second cylinder fixing said landing gear in its extended position.

References Cited in the file of this patent

UNITED STATES PATENTS

| | | |
|---|---|---|
| 1,768,696 | Laddon | July 1, 1930 |
| 2,565,007 | Van Zelm | Aug. 21, 1951 |
| 2,679,827 | Perdue | June 1, 1954 |
| 2,736,523 | Chaplin | Feb. 28, 1956 |
| 2,778,586 | Nyerges et al. | Jan. 22, 1957 |

FOREIGN PATENTS

| | | |
|---|---|---|
| 576,125 | Great Britain | Mar. 20, 1946 |
| 723,895 | Great Britain | Jan. 2, 1953 |
| 913,498 | Germany | June 14, 1954 |